Figure 1:
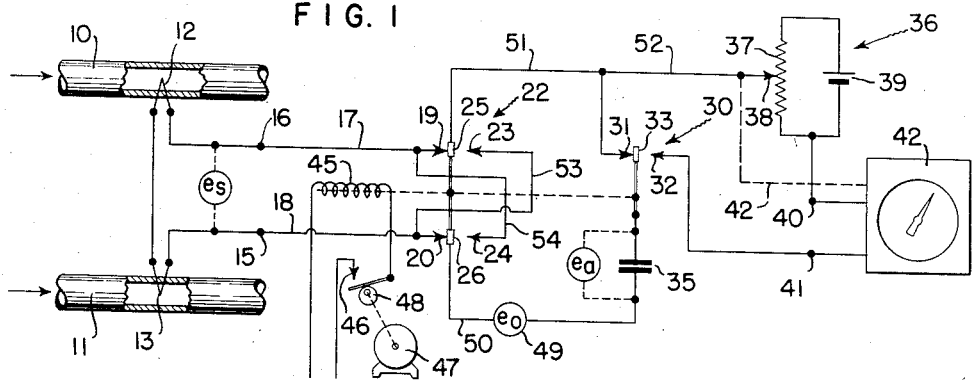

April 21, 1959     W. F. NEWBOLD     2,883,621

ELECTRICAL MEASURING APPARATUS

Filed May 1, 1953

*INVENTOR.*
WILLIAM F. NEWBOLD
BY Arthur H. Swanson
ATTORNEY.

United States Patent Office 2,883,621
Patented Apr. 21, 1959

2,883,621

ELECTRICAL MEASURING APPARATUS

William F. Newbold, Philadelphia, Pa., assignor to Minneapolis-Honeywell Regulator Company, Minneapolis, Minn., a corporation of Delaware Application May 1, 1953, Serial No. 352,361

7 Claims. (Cl. 324—111)

A general object of the present invention is to provide a new and improved electrical circuit which will eliminate or at least minimize the effect of a drift error signal present in the circuit. More specifically, the invention is concerned with an electrical measuring apparatus wherein a drift error signal is cancelled during the measuring operation by a voltage which is of a magnitude equal to the drift voltage and which voltage is opposite in polarity to the drift voltage.

In electrical measuring circuits, particularly those circuits wherein a direct current signal is being measured, there is a continuing possibility of the existence of a drift error signal affecting the normal signal present in the circuit. This drift error signal may be due, for example, to ambient temperature differences affecting thermal junctions in the measuring circuit. As the drift error will generally not remain constant, it is difficult to obtain an accurate signal measurement of the normal control signal on the circuit. While the problems of drift correction have been recognized in the prior art, these prior art devices have operated upon the assumption that the drift signals remain substantially fixed and that once the drift signal has been determined it is possible to eliminate the drift by a single adjustment made when the apparatus is put into operation. This arrangement has its obvious disadvantages in that the presence of any continuing or variable drift signal will not be compensated for during a measuring operation. For a continuous accurate direct current measurement or control, it is essential that the drift correction be continuous and in proportion to the drift.

It is therefore a more specific object of the present invention to provide an electrical measuring apparatus which is characterized by its ability to continuously correct for drift signal error which may be present in the measuring circuit.

A still more specific object of the present invention is to provide an electrical measuring circuit which is subject to drift error signals which circuit includes means for establishing a voltage which may be used to oppose the drift error voltage when the measuring circuit is connected to a signal utilization circuit.

Still another object of the present invention is to provide a measuring circuit wherein there is first established a voltage equal to a drift signal voltage and a voltage to be measured, and this established voltage is connected to the input of a signal utilization circuit with the voltage to be measured, which voltage is reversed in polarity with respect to the drift signal voltage, to cancel the drift voltage.

The various features of novelty which characterize the invention are pointed out with particularity in the claims annexed to and forming a part of this specification. For a better understanding of the invention, its advantages, and specific objects attained with its use, reference should be had to the accompanying drawings and descriptive matter in which there is illustrated and described preferred embodiments of the invention.

Figure 2:
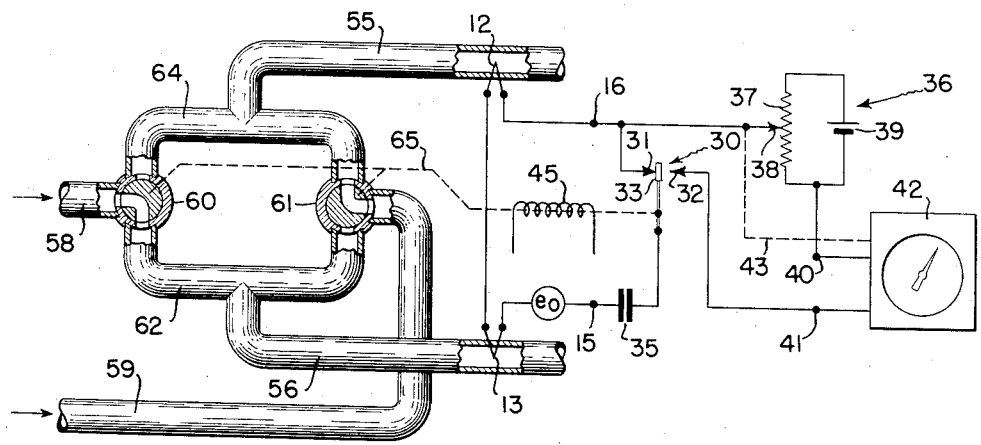

Of the drawings:

Fig. 1 is a schematic showing of one form that the electrical apparatus of the present invention may assume in a particular measuring problem; and Fig. 2 shows a modified form of the apparatus of Fig. 1 wherein a switching function of the apparatus of Fig. 1 has been changed from the electrical circuit to the variables which are being measured.

Referring to Fig. 1, the numerals 10 and 11 represent conduits through which is flowing some fluids whose temperatures are to be measured. Positioned within the pipe 10 is a thermocouple 12 for measuring the temperature of the fluid therein while the thermocouple 13 is positioned within the pipe 11. The temperature of the thermocouples may be indicative of any source condition of the fluid other than its actual temperature, such as, for example, the components of a gas mixture. The two thermocouples 12 and 13 are connected in series with the output leads thereof connected to measuring circuit input terminals 15 and 16. These input leads are in turn connected by a pair of conductors 17 and 18 to one set of contacts 19 and 20 of a double-pole double-throw switch 22. In addition to the switch contacts 19 and 20, the switch 22 includes two further fixed contacts 23 and 24 and a pair of movable contacts 25 and 26, which movable contacts are adapted to move back and forth between the contacts associated therewith.

The measuring circuit includes a further switch 30 which is in the form of a single-pole double-throw switch having a pair of fixed contacts 31 and 32 with a movable contact 33 arranged to move between the two fixed contacts. Connected between the movable contact 33 and the movable contact 26 of the switch 22 is a condenser 35.

A rebalancing voltage source 36 includes a slidewire resistor 37 having an associated slider 38 cooperating therewith. The slidewire resistor 37 has a voltage applied thereto by a suitable source, such as a battery 39. The electrical unbalance signal which may be present on the measuring circuit will appear on output terminals 40 and 41 which output terminals may be connected to the input of any conventional potentiometric measuring apparatus. While a conventional apparatus may do, it is preferred to use apparatus of the type disclosed in the patent to Walter P. Wills, 2,423,540, issued July 8, 1947. The Wills apparatus is characterized by its accuracy and ability to follow small signals on the input thereof in producing appropriate indicating and controlling functions in accordance with the input signal. As shown, this apparatus 42 has an output connection 43 which is effective to drive the slider 38 in the measuring circuit rebalancing network 36.

By way of illustration, the actuation of the switching devices 22 and 30 may be accomplished by a suitable solenoid 45. This solenoid 45 has a control circuit therefor which includes a switch 46. This switch may be periodically actuated by a motor 47 driving a cam 48 to periodically close the switch 46 and energize the solenoid 45. In the position shown upon the drawing with the solenoid de-energized, the switch 22 and the switch 30 have their respective movable contacts biased toward the left.

In considering the operation of Fig. 1, it is assumed that the fluids flowing through the conduits 10 and 11 are of a different temperature so that there is a resultant signal $e_s$ appearing upon the terminals 15 and 16 indicating the difference in temperature between the fluids in the two conduits. It is assumed further that the solenoid 45 is de-energized and that the switches 22 and 30 are biased to the left hand position as they are shown on the drawing. It is further assumed that the measuring circuit has included therein a drift error voltage source of unknown magnitude indicated by the source $e_0$.

With the apparatus in the position shown in Fig. 1, the input voltage from the terminals 15 and 16 will be applied to the condenser 35 to charge the condenser and this voltage will be added in series with a drift voltage $e_o$ at 49. The charging circuit for condenser 35 may be traced from the input terminal 15 through conductor 18, contact 20, movable contact 26, conductor 50, to drift error source 49, condenser 35, contact 33, contact 31, conductor 51, contact 25, contact 19, and conductor 17 back to the other input terminal 16. As there are two voltage sources in this last traced circuit, the voltage established on the condenser 35 will be the algebraic sum of these voltages and will include the input signal and the drift error signal voltages. As this last traced circuit has substantially no resistance therein, the condenser 35 will be charged relatively quickly.

While the condenser 35 is being charged by the drift voltage and the input voltage, the circuit to the input of the indicating and controlling apparatus 42 is open circuited since the switch contact 33 is out of engagement with the associated contact 32. As long as this circuit is open circuited, there will be no indicating and controlling action change undertaken by the instrument 42.

As soon as the motor 47 has driven the cam 48 so as to close the switch 46 in series with the solenoid 45, the solenoid will move the switches 22 and 30 to their actuated positions. When so moved, the switch contact 25 will engage contact 23 and the switch contact 26 will engage contact 24. Further, the switch contact 33 will engage contact 32. With the switches 22 and 30 in this new position, the input signal to the indicating and controlling apparatus 42 will include the input signal, the drift signal, the voltage which has been established on the condenser 35, and the rebalancing signal determined by the position of the slider 38 on the slidewire resistor 37. This input circuit may be traced from the input terminal 40 through the lower portion of the slidewire resistor 37, slider 38, conductor 52, conductor 51, switch blade 25, switch contact 23, conductor 53, conductor 18, terminal 15, to terminal 16 and then back through conductor 17, conductor 54, switch contact 24, switch blade 26, drift voltage source 49, condenser 35, switch contact 33, switch contact 32, and conductor 55 back to the other input terminal 41.

It will be noted from this last traced circuit that the voltage on the input terminals 15 and 16 has been reversed with respect to the voltage from the drift signal source 49. It will also be noted that the voltage upon the condenser 35 is effectively reversed in its position in the electrical circuit so that the net effect is for the voltage on the condenser 35 to be of a polarity which will cause that portion thereof attributed to the drift voltage to cancel out the drift voltage present when the circuit is connected in the measuring position. Further, the voltage attributed to the input signal voltage will be added to the magnitude of the input signal voltage on terminals 15 and 16. Thus, the input signal on terminals 40 and 41 will be twice the input signal present on the input terminals 15 and 16. This signal voltage on the terminals 40 and 41 will be opposed by a voltage derived from the rebalancing network 36 with the slider 38 assuming a position upon the slidewire resistor 37 so that the voltage thereof will be equal to twice the input voltage on the input terminals 15 and 16.

The foregoing may be understood by considering algebraically the functioning of the circuit. When the condenser is connected in its charging circuit, the final voltage on the condenser will be as follows:

(1) $$e_s + e_o = e_a$$

where $e_s$ is the input signal voltage and $e_o$ is the drift error voltage. When the condenser 35 is connected into the input circuit of the device 42 in series with the input signal voltage and the drift voltage, the following will result.

(2) $$-e_s + e_o = e_a - XE$$

where $XE$ is the adjustable voltage derived from the rebalancing network 36, where X goes from 0 to 1 and E is the voltage of battery 39. By subtracting Equation 2 from Equation 1 the difference becomes:

(3) $$XE = 2e_s$$

From Equation 3 it can be seen that the voltage on the terminals 40 and 41 will have a function of twice the input signal on terminals 15 and 16 and the drift signal will cancel.

While the instrument 42 is indicated as merely providing a rebalancing source for the rebalancing network 36, this apparatus may be used in any desired manner for controlling some variable affecting the fluid flow conditions in the conduits 10 and 11 or for some other controlling purpose.

In order that the apparatus of Fig. 1 operate properly, it is essential that the input resistance to the instrument 42 be of a relatively high value so that the condenser 35 when connected thereto will not discharge materially during the measuring operation. The time length during which the condenser 35 may be connected to the input will be dependent upon this time constant as well as upon the rate of operation of the solenoid 45. That rate is determined by the input resistance and the charging time for the condenser 35 as well as the discharge time of the condenser. Under normal operating conditions where maximum speed of response is required, the discharge time is sufficiently long that there is a negligible change in potential from the condenser 35. If a short time constant is present for condenser 35 when discharged, it will still function to create pulses tending to eliminate the drift condition but the response speed will be decreased.

The apparatus of Fig. 2 is a modified version of that of Fig. 1 where the switching action has been shifted to the variables which are being measured by the thermocouples 12 and 13. The components common to Figs. 1 and 2, carry the same reference numerals.

Newly added to Fig. 2 is a mechanism for periodically reversing the flows of the fluids passing through conduits 55 and 56. The input to this flow reversing mechanism includes a pair of conduits 58 and 59. The conduit 58 goes into the input of a flow reversing valve 60 while the conduit 59 connects to the input of a flow reversing valve 61. The output of the conduit 60 is shown emptying into a conduit 62 which in turn feeds the conduit 56 while the valve 61 is shown having an outlet into a conduit 64 which is in turn connected to an outlet conduit 55. The valves 60 and 61 are preferably connected together so that when the flow in one is reversed the flow in the other will also be reversed. As shown, this flow reversing is accomplished by the solenoid 45 operating through suitable connecting means 65.

The operation of the apparatus of Fig. 2 is basically the same as that of Fig. 1 in that when the condenser 35 is being charged, the input signal on terminals 15 and 16 will be of one polarity and this signal will be added to the drift signal in the input circuit. Specifically, when the apparatus is in the position shown in Fig. 2, the fluid flowing through the inlet conduit 58 will pass through the conduit 62 and out through the conduit 56 so as to establish a predetermined temperature for thermocouple 13. The fluid flowing through conduit 59 will pass through the valve 61 and conduit 64 to the conduit 55 to thereby establish the temperature of the thermocouple 12. As long as a temperature difference exists between the thermocouples 12 and 13 there will be an output voltage on the terminals 15 and 16 and this output voltage will be effective to charge the condenser 35 to a voltage which will be dependent upon the magnitude of the voltage on the output of the thermocouples 12 and 13 and the drift voltage present in the input circuit. This charging circuit is established by way of the switch blade 33 and switch contact 31 which directly connects the condenser 35 into the input circuit.

When the flow reversing mechanism operates due to the change in energization of the solenoid 45, the flow reversing valves 60 and 61 will reverse the direction of flow through the conduits 55 and 56. With the valves reversed, the input conduit 58 will pass its fluid through the conduit 64 to the conduit 55 to thereby control the temperature of thermocouple 12. Likewise, when the valve 61 is reversed, the input flow through the conduit 59 will pass through the valve 61 through conduit 62 to the outlet conduit 56 to thereby control the temperature of the thermocouple 13. With the input fluid flows reversed, the temperatures of the thermocouples 12 and 13 will also be reversed. With these signals reversed and with the solenoid moving the switch blade 33 to engage contact 32, the input signal to the instrument 42 will now be the difference between Equations 1 and 2, set forth above. If twice the input voltage is not balanced by the voltage derived from the slider 38, there will be a resultant input signal to the instrument 42 to effect repositioning of the slider 48 until a balanced condition is reached. The operation of the instrument 42 necessary to effect this rebalancing will be an indication of the difference in the temperatures of the thermocouples 12 and 13.

As with Fig. 1, the present apparatus may also have a relatively long time constant for the discharge circuit for condenser 35 so that during the measuring operation there will be substantially no change in voltage on the condenser. Additionally, the apparatus of Fig. 2 requires that the time lag of the thermocouples 12 and 13 be relatively short in order that the record maintained by the instrument 42 be steady. If desired, it is possible to modify the circuit to provide for a delay in the operation of the switch 30 after the flow reversing switches have been actuated in order that the temperatures of the thermocouples 12 and 13 be fairly stable when a measurement is made. The principles applied to the measuring circuits of Figs. 1 and 2 may be applied to other types of electrical circuits which are subject to drift, for example, direct current amplifiers. In such circuits, the amplifier might be positioned between the input signal reversing switch 22 of Fig. 1 and switch 30 with the signal on leads 50 and 51 being amplified.

While, in accordance with the provisions of the statutes, there has been illustrated and described the best forms of the embodiments of the invention known, it will be apparent to those skilled in the art that changes may be made in the forms of the apparatus disclosed without departing from the spirit of the invention as set forth in the appended claims and that in some cases certain features of the invention may be used to advantage without a corresponding use of other features.

What I claim as new and desire to secure by Letters Patent is:

1. Apparatus for cancelling drift error in a direct current measuring circuit comprising, an input signal source, an input electrical circuit connected to said signal source and having an unknown drift signal present thereon, a condenser, means connecting said condenser to said input circuit so that said condenser is charged to a potential which is the algebraic sum of the input signal and the drift signal, means for reversing the input signal polarity with respect to the drift signal, signal utilization means, and means connecting said charged condenser, said reversed input signal, and said drift signal serially with the input of said signal utilization means so that the input signal will appear double in magnitude and the drift signal will cancel.

2. Apparatus for cancelling drift error in a direct current measuring circuit comprising, an input signal source including a pair of thermocouple devices adapted to be exposed to two variables, an input electrical circuit connected to said signal source and having an unknown drift signal present thereon, first means for establishing a potential which is equal to the algebraic sum of the input signal and the drift signal, second means for reversing the output of said signal source with respect to the drift signal, signal utilization means, and third means connecting said first means, said reversed input signal source and said drift signal source serially with the input of said signal utilization means so that the input signal will appear double in magnitude and the drift signal will cancel.

3. Apparatus as defined in claim 2 wherein said reversing means includes means for reversing the variables acting on said pair of thermocouples.

4. Apparatus as claimed in claim 2 wherein said reversing means comprises an electrical switch which is periodically operated.

5. Apparatus as defined in claim 2 wherein said signal utilization means includes means for producing a voltage rebalancing the input signal voltage and which rebalancing voltage is double the magnitude of the input voltage.

6. Apparatus for cancelling drift error in a direct current measuring circuit comprising an input electrical circuit for connection to an input signal source and having an unknown drift signal thereon, a storage means, means connecting said storage means to said input circuit whereby to establish in said storage means a signal which is the algebraic sum of the input signal and the drift signal, means for reversing the input signal with respect to the drift signal, signal utilization means, and means connecting said storage means, said reversed input signal and said drift signal serially with the input of said utilization means so that the input signal will appear double in magnitude and the drift signal will cancel.

7. The method of eliminating drift error in a direct current measuring circuit which comprises the steps of measuring and storing the algebraic sum of the drift error and an input signal, reversing the polarity of the input signal with respect to the drift error and simultaneously with the reversal of said input signal adding the stored signal to the sum of the reversed input signal and the drift error whereby to cancel said drift error and effectively double said input signal.

References Cited in the file of this patent
UNITED STATES PATENTS

| | | |
|---|---|---|
| 2,368,351 | Ewen | Jan. 30, 1945 |
| 2,511,855 | Keck et al. | June 20, 1950 |
| 2,630,486 | Rieke | Mar. 3, 1953 |
| 2,750,547 | Wannamaker et al. | June 12, 1956 |

OTHER REFERENCES

Wenner: Journal of Research, National Bureau of Standards, vol. 22, April 1939, Research Paper RP1194, pp. 425–430. (Copy in 324–63.)